United States Patent
Duenias et al.

(10) Patent No.: US 9,594,958 B2
(45) Date of Patent: Mar. 14, 2017

(54) DETECTION OF SPOOFING ATTACKS FOR VIDEO-BASED AUTHENTICATION

(71) Applicant: Intel Corporation, Santa Clara, CA (US)

(72) Inventors: Oren Duenias, Kiriat Ono (IL); Shachaf Levi, Zichron Yaacov (IL); Ayelet Naor, Ramat Gan (IL); Omer Ben-Shalom, Rishon Le-Tizion (IL)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 14/551,839

(22) Filed: Nov. 24, 2014

(65) Prior Publication Data

US 2016/0148066 A1 May 26, 2016

(51) Int. Cl.
*G06K 9/00* (2006.01)

(52) U.S. Cl.
CPC ...... *G06K 9/00711* (2013.01); *G06K 9/00255* (2013.01)

(58) Field of Classification Search
CPC G06K 9/00899; G06K 9/00744; H04L 63/08; H04H 12/06
USPC ....... 382/115, 170, 171, 194, 224, 229, 118, 382/128, 154, 209, 218, 278; 340/5.8, 340/5.86, 5.81, 5.82
See application file for complete search history.

(56) References Cited

U.S. PATENT DOCUMENTS

| | | | | |
|---|---|---|---|---|
| 5,933,502 A * | 8/1999 | Aucsmith | .......... | G06K 9/00885 250/330 |
| 6,418,223 B1 * | 7/2002 | Wootton | ............ | H04N 1/32128 358/535 |
| 6,942,473 B2 * | 9/2005 | Abrahamson | ..... | A61M 5/14228 417/474 |
| 6,942,573 B2 * | 9/2005 | Elliott | ..................... | A63F 13/12 463/29 |
| 7,810,163 B2 * | 10/2010 | Evans | ..................... | G06F 21/10 380/200 |
| 7,810,674 B2 * | 10/2010 | Belongia | ................. | B01F 5/102 222/424 |
| 7,813,822 B1 * | 10/2010 | Hoffberg | ............ | G06K 9/00369 381/73.1 |

(Continued)

FOREIGN PATENT DOCUMENTS

EP 2680192 1/2014

OTHER PUBLICATIONS

International Searching Authority, "International Search Report and Written Opinion", issued in connection with International Patent Application No. PCT/US2015/057169, dated Feb. 2, 2016 (12 pages).

*Primary Examiner* — Yosef Kassa
(74) *Attorney, Agent, or Firm* — Hanley, Flight & Zimmerman, LLC

(57) ABSTRACT

Methods, apparatus, systems and articles of manufacture detect spoofing attacks for video-based authentication are disclosed. Disclosed example method to perform video-based authentication include determining whether a sequence of input images provided to perform video-based authentication of a subject exhibits a first region having fluctuating pixel values. Such example methods also include determining that the sequence of input images is associated with a spoofing attack in response to determining that the sequence of input images exhibits the first region having fluctuating pixel values.

25 Claims, 10 Drawing Sheets

(56) References Cited

U.S. PATENT DOCUMENTS

| | | | |
|---|---|---|---|
| 8,095,992 B2 * | 1/2012 | Merkle, Jr. | G11B 20/00086 |
| | | | 369/275.1 |
| 8,316,237 B1 * | 11/2012 | Felsher | H04L 9/0825 |
| | | | 380/282 |
| 8,600,830 B2 * | 12/2013 | Hoffberg | G06Q 30/0207 |
| | | | 705/14.71 |
| 8,692,863 B2 * | 4/2014 | Tucker | H04L 12/1827 |
| | | | 348/14.08 |
| 2005/0047662 A1 | 3/2005 | Gorodnichy | |
| 2010/0033677 A1 | 2/2010 | Jelinek | |
| 2013/0300900 A1 | 11/2013 | Pfister et al. | |
| 2014/0307929 A1 | 10/2014 | Nechyba et al. | |

\* cited by examiner

DETECTION OF SPOOFING ATTACKS FOR VIDEO-BASED AUTHENTICATION

FIELD OF THE DISCLOSURE

This disclosure relates generally to user authentication and, more particularly, to detection of spoofing attacks for video-based authentication.

BACKGROUND

Visual authentication utilizes one or more image recognition procedures, such as a facial recognition procedure, to authenticate subjects, such as employees, authorized users, etc., using images captured by a camera or other optical sensor. Visual authentication based on single images is susceptible to spoofing using photos of the subject, and/or using still images of the subject displayed by a media device. More sophisticated video-based authentication techniques, which check for motion in addition to performing image recognition, are also susceptible to spoofing using videos of the subject displayed by a media device.

Figure 1:
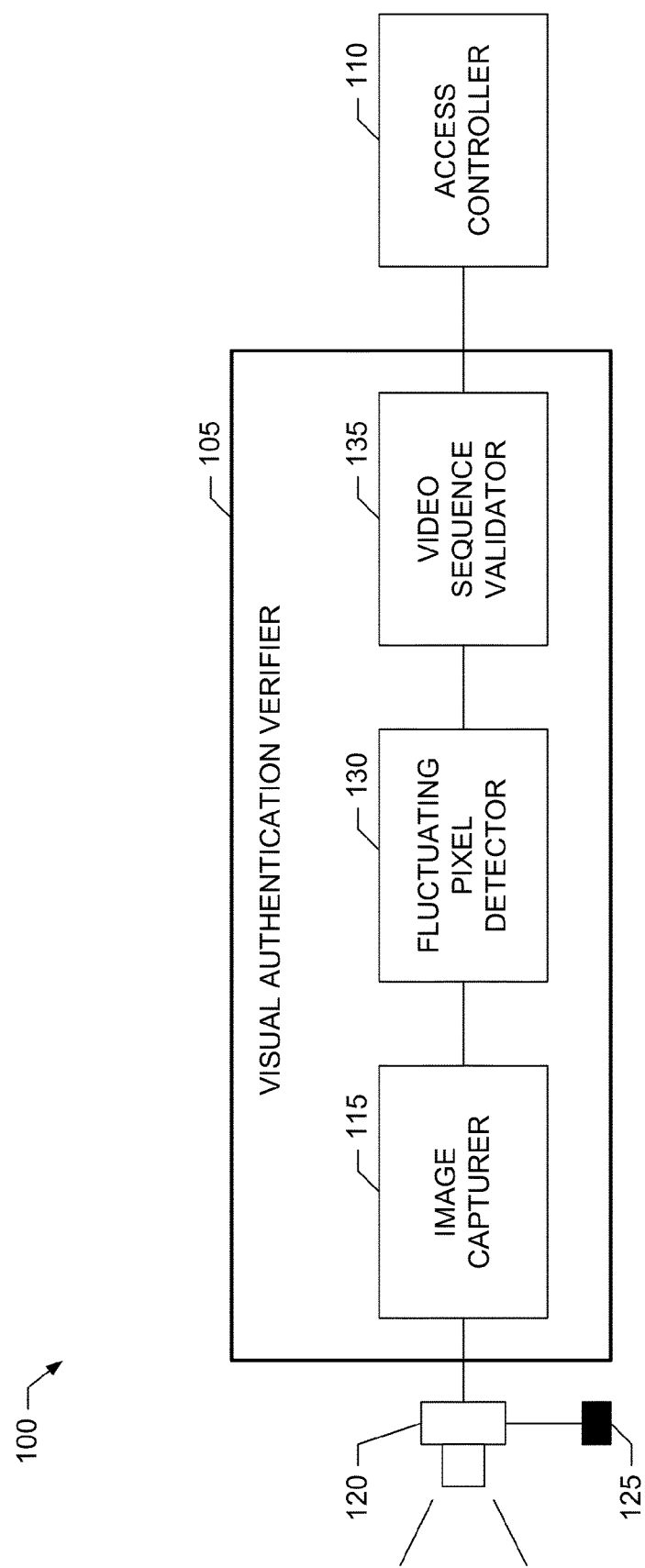
FIG. 1 is a block diagram of an example system including an example visual authentication verifier to detect spoofing attacks for video-based authentication as disclosed herein.

The material disclosed herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, wherever possible, the same reference numbers will be used throughout the drawing(s) and accompanying written description to refer to the same or like parts, elements, etc.

DETAILED DESCRIPTION

Methods, apparatus, systems and articles of manufacture (e.g., physical storage media) to detect spoofing attacks for video-based authentication are disclosed herein. Some example methods to perform video-based authentication disclosed herein include determining whether a sequence of input images provided to perform video-based authentication of a subject exhibits a first region having fluctuating pixel values. Some such example methods also include determining that the sequence of input images is associated with a spoofing attack in response to determining that the sequence of input images exhibits the first region having fluctuating pixel values.

In some disclosed example methods, the sequence of input images provided to perform video-based authentication of the subject is a second sequence of input images, and the example methods further include randomly sampling a first sequence of input images to obtain the second sequence of input images. In some such example methods, randomly sampling the first sequence of input images includes capturing the first sequence of input images at a first rate (e.g., an input sampling rate or input frame rate) higher than a second rate (e.g., a desired frame rate). Some such example methods also include grouping the first sequence of input images into successive groups of input images containing respective numbers of images based on a relationship (e.g., a ratio) between the first rate and the second rate. Some such example methods further include randomly selecting one input image from respective ones of the successive groups of input images to form the second sequence of input images.

Additionally or alternatively, in some disclosed example methods, determining whether the sequence of input images exhibits the first region having fluctuating pixels values includes determining differences between successive pairs of images in the sequence of input images to determine a sequence of difference images. Some such example methods also include processing the sequence of difference images to determine whether the sequence of input images exhibits the first region having fluctuating pixel values. In some such example methods, processing the sequence of difference images includes processing successive pairs of difference images in the sequence of difference images to identify fluctuating pixels. For example, fluctuating pixels are pixels that fluctuate between at least two values across three successive images in the sequence of input images. Some such example methods also include determining a number of pixels included in a first group of neighboring fluctuating pixels. Some such example methods further include, if the number of pixels satisfies a threshold, determining that the sequence of input images exhibits the first region having fluctuating pixel values, with the first region corresponding to the first group of neighboring fluctuating pixels.

Additionally or alternatively, some disclosed example methods further include triggering operation of a further access control procedure to authenticate the subject based on the sequence of input images in response to determining that the sequence of input images does not exhibit any region having fluctuating pixel values.

Additionally or alternatively, some disclosed example methods further include determining that the sequence of input images depicts a scene including content generated by a video display in response to determining that the sequence of input images exhibits the first region having fluctuating pixel values.

These and other example methods, apparatus, systems and articles of manufacture (e.g., physical storage media) to detect spoofing attacks for video-based authentication are disclosed in further detail below.

As mentioned above, visual authentication techniques that process a single image to authenticate a subject are susceptible to spoofing using photos of the subject, and/or using still images of the subject displayed by a media device. This is because image recognition techniques, such as facial recognition techniques, employed by image-based authentication systems may be unable to distinguish between an image of the real subject captured with a camera and an image of the subject's photo or other still image of the subject captured by the camera. More sophisticated video-based authentication techniques check for motion as a way to distinguish the video taken of the real subject, which will exhibit motion characteristics, and video taken of the subject's photo or other still image of the subject, which will not have any motion. However, even these more sophisticated video-based authentication techniques are susceptible to the technical problem of being spoofed using videos of the subject, rather than a still image, displayed by a media device.

Examples of video-based authentication with spoofing detection disclosed herein provide technical solutions to such technical problems. Examples of video-based authentication with spoofing detection disclosed herein detect that a sequence of input images (e.g., obtained from a camera or other optical sensor) provided for video-based authentication is associated with a spoofing attack using a video of a subject, rather than a live subject, by determining that the sequence of input images exhibit characteristics of a video presentation rather than video captured of a live subject. As disclosed in further detail below, in some such examples of video-based authentication with spoofing detection, the sequence of input images is analyzed to determine if it contains one or more regions having pixel fluctuations. Because such regions of pixel fluctuation are likely to be associated with the refreshing of a video display and/or the backlight flashing/scanning of the video display, and are unlikely to occur in a captured video of a live subject, detection of one or more regions having pixel fluctuations is indicative of a sequence of input images associated with a video presentation by a media device and, thus, associated with a spoofing attack. However, if no regions of pixel fluctuation are detected in a sequence of input images, then it is unlikely the sequence is associated with a spoofing attack and, instead, it is likely the sequence of input images is associated with a video of a live subject. Thus, detection of region(s) of pixel fluctuation in a sequence of input images can determine whether the sequence of images is associated with a video presentation or with a live subject and, thus, can solve the problem of determining whether the sequence of input images is the result of a spoofing attack or a true attempt to authenticate a subject.

Furthermore, in some video-based authentication with spoofing detection examples disclosed herein, the sequence of input images to be analyzed is obtained by randomly sampling the input images captured by a camera or other sensing device positioned to view the subject being authenticated. Such random sampling can increase the likelihood that the sequence of input images will capture occurrences of a video display being refreshed and/or undergoing backlight flashing/scanning, etc. As such, obtaining the sequence of input images via random sampling can increase the accuracy of detecting whether the sequence of input images is the result of a spoofing attack or a true attempt to authenticate a subject, thereby providing a further technical benefit not available in prior video-based authentication systems.

Turning to the figures, a block diagram of an example video-based authentication system 100 including an example visual authentication verifier 105 capable of detecting spoofing attacks as disclosed herein is illustrated in FIG. 1. In the illustrated example of FIG. 1, the visual authentication verifier 105 verifies whether input video (e.g., a sequence of input images) to be used to authenticate a subject is valid or, in other words, is a true, real-time (e.g., live) depiction of the subject, or is associated with a spoofing attack (e.g., is a copy of the subject generated by a video display of a media device) and, thus, invalid. If the visual authentication verifier 105 determines the input video is valid, the visual authentication verifier 105 triggers an example access controller 110 to process the input video to authenticate the subject. However, if the visual authentication verifier 105 determines the input video is invalid (e.g., is associated with a spoofing attack), the visual authentication verifier 105 indicates that the subject is not authentic (e.g., authentication is automatically unsuccessful) and, in some examples, prevents the access controller 110 from processing the input video.

The example visual authentication verifier 105 of FIG. 1 includes an example image capturer 115 to obtain a sequence of input images from video captured by an example camera 120 in communication with the image capturer 115. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events. The example camera 120 may be implemented by any number and/or type(s) of cameras, optical sensors, etc. As disclosed in further detail below in connection with FIGS. 2A-B, the example camera 120 of the example video-based authentication system 100 is positioned to capture video of an area in which a subject to be authenticated is expected to reside. In some examples, an example actuator 125, such as a switch, a motion sensor, an infrared sensor, etc., may trigger the camera 120 to begin capturing video when a subject, such as a person (e.g., an employee, a user, etc.), an animal, an object, etc., enters the area covered by the camera 120.

Figure 3:
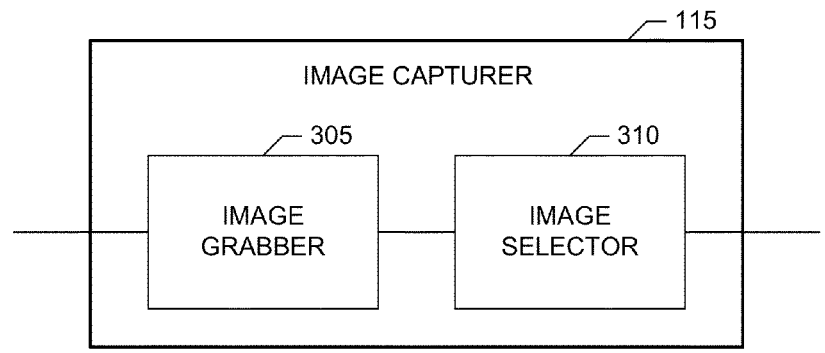
FIG. 3 is a block diagram of an example image capturer that may be used to implement the example visual authentication verifier of FIG. 1.

The example image capturer 115 of FIG. 1 samples images from the video sequence output from the camera 120 to obtain a sequence of input images to be used to authenticate the subject positioned in front of the camera 120. In some examples, the image capturer 115 randomly samples the images from the video sequence output by the camera 120 to enhance the ability of the visual authentication verifier 105 to be able to determine whether the sequence of input images is valid or associated with a spoofing attack. An example implementation of the image capturer 115 is illustrated in FIG. 3, which is described in further detail below.

The example visual authentication verifier 105 of FIG. 1 also includes an example fluctuating pixel detector 130 to detect one or more regions of fluctuating pixels, if present, in the sequence of input images obtained by the image capturer 115. Regions of fluctuating pixels, also referred to as blinking pixels, oscillating pixels, etc., are characteristic of a video sequence obtained by capturing (e.g., with the camera 120) a video display of a media device (e.g., a tablet computer, a smartphone, a notebook computer, a video camera, etc.) as the display is being refreshed, undergoing backlight flashing/scanning, etc. In contrast, a video sequence obtained by capturing (e.g., with the camera 120) a true subject in real-time may exhibit changes in the pixels as the subject moves, but does not usually exhibit the region(s) of fluctuating pixels associated with video captured of a video display.

For example, if a sequence of input images corresponds to video captured of the video display of a media device, an input image in the sequence may depict the video display as the display is being refreshed and/or undergoing backlight flashing/scanning As the display is being refreshed, region(s) of such an image corresponding to portion(s) of the display that have not yet been refreshed may have lower intensity than the same region(s) in preceding and/or subsequent images in the sequence of input images. Similarly, when the display is undergoing backlight flashing or scanning (e.g., to reduce perceived motion blur), region(s) of the image corresponding to portion(s) of the display in which the backlight was turned off may be darker than the same region(s) in preceding and/or subsequent images in the sequence of input images. When successive images in the captured video sequence, which include the image depicting the video display being refreshed and/or undergoing backlight flashing or scanning, are examined, the region(s) of the image corresponding to the portion(s) of the display that have not yet been refreshed and/or in which the backlight was turned off will tend to include pixels having fluctuating (or blinking, flashing, etc.) values across the successive images. The example fluctuating pixel detector 130 operates to detect such region(s) of fluctuating pixels which, if detected, indicate that the sequence of input images is associated with a spoofing attack because the images correspond to video captured of a video display and not of a live subject.

As mentioned above, in some examples, the image capturer 115 obtains the sequence of input images to be processed by randomly sampling the images from the video sequence output from the camera 120. Such random sampling can enhance the ability of the fluctuating pixel detector 130 to detect region(s) of fluctuating pixels in the sequence of input images. For example, without random sampling, it is possible that the frame rate of the sequence of input images obtained from the camera 120 could align with the frame rate of a video display being used to perform a spoofing attack against the video-based authentication system 100. If such alignment occurs, the sequence of input images may not capture the video display as it is being refreshed and/or undergoing backlight flashing/scanning Random sampling of the video sequence output from the camera 120 reduces the likelihood that such an alignment will occur because, even if the frame rates of the sequence of input images of the captured video display are the same, the sequence of input images obtained by random sampling will vary (e.g., jitter) around the frame rate of the video display.

In the illustrated example of FIG. 1, the fluctuating pixel detector 130 detects region(s) of fluctuating pixels in the sequence of input images obtained by the image capturer 115 by determining differences between successive pairs of images in the sequence of input images to determine a sequence of difference images. The example fluctuating pixel detector 130 then processes the sequence of difference images to determine whether the sequence of input images exhibits one or more regions having fluctuating pixel values. Examples of such processing are disclosed in further detail below in connection with the description of FIG. 4, which illustrates an example implementation of the fluctuating pixel detector 130.

The example visual authentication verifier 105 of FIG. 1 further includes an example video sequence validator 135 to indicate whether the video sequence output from the camera 120 is valid for use in authenticating a subject. For example, if the fluctuating pixel detector 130 detects one or more regions of fluctuating pixels in the sequence of images obtained by the image capturer 115, the video sequence validator 135 determines that the sequence of input images depicts a scene including content generated by a video display of a media device and, thus, is associated with a spoofing attack. In some such examples, the video sequence validator 135 further prevents the access controller 110 from performing authentication using the video sequence from the camera 120 and, instead, automatically indicates that authentication of the purported subject failed or was unsuccessful.

However, if the fluctuating pixel detector 130 does not detect any regions of fluctuating pixels in the sequence of images obtained by the image capturer 115, the video sequence validator 135 determines that the sequence of input images depicts a scene including a true subject to be authenticated. In some such examples, the video sequence validator 135 further triggers the access controller 110 to perform one or more access control procedures to authenticate the subject using the sequence of input images obtained from image capturer 115, and/or using the video sequence output from the camera 120.

In the illustrated example of FIG. 1, the access controller 110 implements any number and/or type(s) of access control procedures capable of authenticating a subject from a video sequence. For example, the access controller 110 may implement one or more image recognition algorithms, such as a facial recognition algorithm, a target recognition algorithm, a feature identification algorithm, etc., to determine whether the input video sequence depicts a particular (e.g., previously-identified) subject. In some examples, if the access controller 110 determines that the video sequence depicts a particular (e.g., previously-identified) subject, the access controller 110 indicates that authentication of the subject was successful and, in some examples, displays an identity of the subject. In some examples, the access controller 110 then permits the subject to access the system, area, etc., protected by the video-based authentication system 100. However, if the access controller 110 is unable to authenticate the subject using the video sequence, in some examples the access controller 110 indicates that authentication of the subject was unsuccessful and prevents the subject from accessing the system, area, etc., protected by the video-based authentication system 100.

Although the example visual authentication verifier 105 has been described in the context of the example video-based authentication system 100, the example visual authentication verifier 105 is not limited thereto. For example, the visual authentication verifier 105 can be employed in any environment of use in which determining whether a captured video sequence depicts a scene including content generated by a video display of a media device would be beneficial.

Figure 2A:
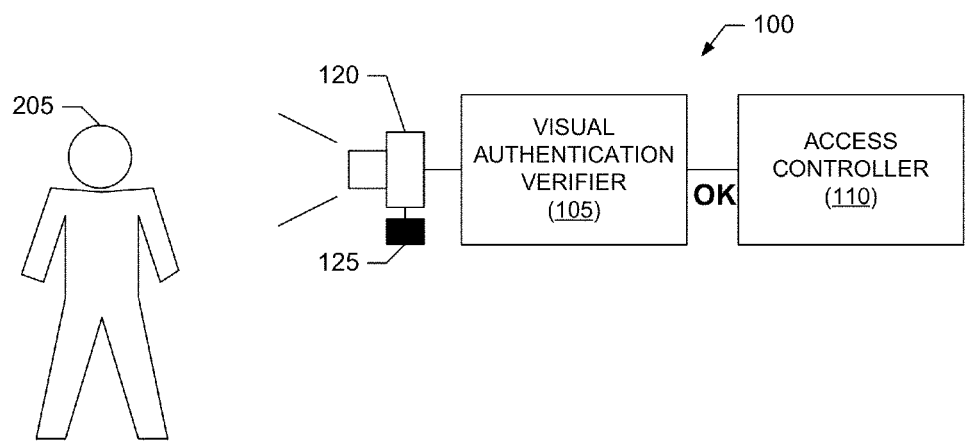
FIGS. 2A-B collectively illustrate example operation of the example system of FIG. 1 to detect spoofing attacks for video-based authentication.
Figure 2B:
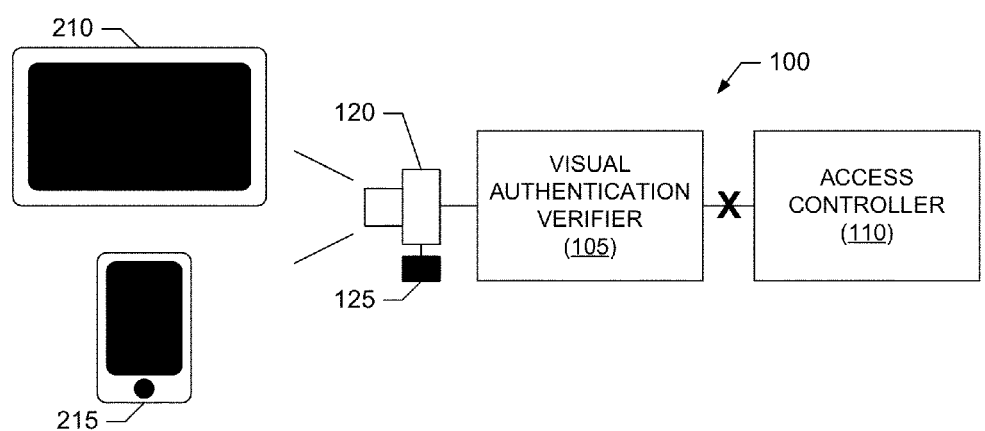

Example operation of the example video-based authentication system 100 of FIG. 1 to detect spoofing attacks for video-based authentication is illustrated in FIGS. 2A-B. In the illustrated example of FIGS. 2A-B, the camera 120 of the example video-based authentication system 100 is positioned to capture an area in which subjects to be authenticated are expected to reside. For example, the camera 120 may be positioned to capture an area in front of a doorway subject to access control, an area in front of a computer terminal, etc. In the illustrated example of FIG. 2A, the camera 120 of the video-based authentication system 100 captures a video sequence depicting an example subject 205 in the monitored area. Because the video sequence captured by the camera 120 is of a real subject, the example visual authentication verifier 105 of the video-based authentication system 100 does not detect any regions of fluctuating pixels in a sequence of input images obtained from the video sequence captured by the camera 120. Accordingly, the visual authentication verifier 105 determines that the video sequence is valid and triggers the example access controller 110 to perform video-based authentication using the sequence of input images and/or the original video sequence output from the camera 120 (which is represented by the word "OK" in FIG. 2A).

In the illustrated example of FIG. 2B, the camera 120 of the video-based authentication system 100 captures a video sequence depicting content generated by a video display in the monitored area, such as a video display of an example tablet computer 210, or of an example smartphone 215, etc. Because the video sequence captured by the camera 120 depicts content generated by a video display, the example visual authentication verifier 105 of the video-based authentication system 100 detects one or more regions of fluctuating pixels in the sequence of input images obtained from the video sequence captured by the camera 120. Accordingly, the visual authentication verifier 105 determines that the video sequence is associated with a spoofing attack and prevents the example access controller 110 from performing video-based authentication using the sequence of input images and/or the original video sequence output from the camera 120 (which is represented by an "X" in FIG. 2B).

A block diagram of an example implementation of the image capturer 115 of FIG. 1 is illustrated in FIG. 3. The example image capturer 115 of FIG. 3 includes an example image grabber 305 to grab or, in other words, capture a first sequence of input images from a video output of the example camera 120. The example image capturer 115 of FIG. 3 also includes an example image selector 310 to randomly select images from the first sequence of input images captured by the image grabber 305 to form a second sequence of input images. In the illustrated example, the second sequence of input images is the sequence of input images to be used by the visual authentication verifier 105 to determine whether the video captured by the camera is valid or is associated with a spoofing attack.

In the illustrated example of FIG. 1, the image grabber 305 captures the first sequence of input images from the camera video output at a sampling frame rate (e.g., a first rate) that is higher than the desired frame rate (e.g., a second rate) of the second sequence of input images to be used by the visual authentication verifier 105. For example, the second (e.g., desired) rate may be S2 frames per second, where S2 is 15, 30, etc., or some other value. In such examples, the image grabber 305 captures the first sequence of input images from the camera video output at a first (e.g., sampling) rate of S1>S2. For example, S1 may be a multiple, M, of S2 such that S1=M*S2, where M=2, 5, 10, 30, etc., or some other integer or non-integer value.

In the illustrated example of FIG. 1, the image selector 310 randomly selects images from the first sequence of input images captured by the image grabber 305 by grouping the images in the first sequence into successive groups of input images containing respective numbers of images determined by the relationship (e.g., a ratio) between the first (e.g., sampling) rate and the second (e.g., desired) rate. For example, if the second (e.g., desired) rate is S2 frames per second, and the first (e.g., sampling) rate is S1=M*S2, then the image selector 310 groups the images in the first sequence into successive groups of input images each containing S1/S2=M images. The image selector 310 of the illustrated then downsamples (e.g., decimates) the first sequence of input images by randomly selecting one input image from each one of the successive groups of input images to form the second sequence of input images. In some examples, the image selector 310 utilizes a random number generator to select one input image from a respective group of input images. In some examples, the image selector 310 utilizes a pre-defined selection pattern, a round-robin technique, etc., to select one input image from a respective group of input images.

Figure 4:
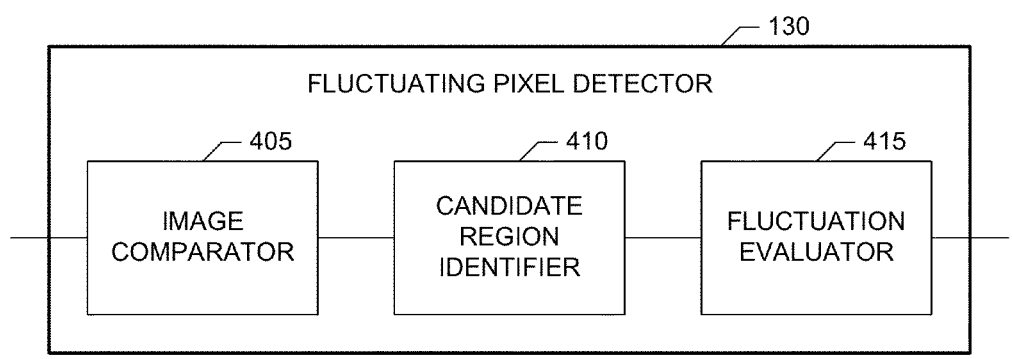
FIG. 4 is a block diagram of an example fluctuating pixel detector that may be used to implement the example visual authentication verifier of FIG. 1.

A block diagram of an example implementation of the fluctuating pixel detector 130 of FIG. 1 is illustrated in FIG. 4. The example fluctuating pixel detector 130 of FIG. 4 includes an example image comparator 405 to determine differences between successive pairs of images in a sequence of input images provided by the example image capturer 115 to determine a sequence of difference images. For example, let the sequence of input images be represented by $I_n(x,y)$, where $I_n$ denotes the image at frame index n, and (x,y) ranges over the $0 \leq x \leq X-1$ and $0 \leq y \leq Y-1$ to index the pixels in the frame. The, the image comparator 405 determines the sequence of difference images as $D_n(x,y)=I_n(x,y)-I_{n-1}(x,y)$, which corresponds to the pixel-wise difference between the pair of successive input images $I_n(x,y)$ and $I_{n-1}(x,y)$.

The example fluctuating pixel detector 130 of FIG. 4 also includes an example candidate region identifier 410 to process the sequence of difference images determined by the example image comparator 405 to identify candidate regions of fluctuating pixels for further evaluation. In the illustrated example, the candidate region identifier 410 processes successive pairs of difference images in the sequence of difference images to identify fluctuating pixels. For example, the candidate region identifier 410 may determine that a pixel is a fluctuating pixel if (1) a first difference image indicates that the value (e.g., luminance, chrominance, etc., or any combination thereof) of the pixel changed by at least a first threshold amount, and (2) a combination of the first difference image and a subsequent second difference image (which may be the next subsequent difference image or a later difference image in the sequence) indicates that the value of the pixel returns back to within a second threshold amount of the original pixel value. The second threshold amount may be the same or different from (e.g., lower than) the first threshold amount.

For example, if $D_n(x,y)=I_n(x,y)-I_{n-1}(x,y)$ represents the difference image at frame time n, then any pixel (x,y) in the difference image having a value satisfying (e.g., meeting or exceeding) the first threshold amount is determined to satisfy the first condition described above. Adding this difference image to the next difference image in the sequence, namely, $D_{n+1}(x,y)=I_{n+1}(x,y)-I_n(x,y)$, yields $D_n(x,y)+D_{n+1}(x,y)=I_n(x,y)-I_{n-1}(x,y)+I_{n+1}(x,y)-I_n(x,y)=I_{n+1}(x,y)-I_{n-1}(x,y)$, which corresponds to the difference between the original image at frame time n−1 and the image at frame time n+1. For each pixel (x,y) that satisfied the first condition in the difference image $D_n(x,y)$, the candidate region identifier 410 examines that same pixel location in the image $D_n(x,y)+D_{n+1}(x,y)$ to determine if the value at that pixel location returned to be within the second threshold amount of the original value. If the candidate region identifier 410 determines that the value of an examined pixel location has returned to be within the second threshold amount, then the candidate region identifier 410 determines that pixel at the examined location fluctuated between at least two values (e.g., its original value in image $I_{n-1}$ and its subsequent value in image $I_n$) over the three images $I_{n-1}(x,y)$, $I_{n-1}(x,y)$ and $I_{n+1}(x,y)$ and, thus, that pixel was a fluctuating pixel during frame times n−1 to n+1.

Expressed mathematically, if the value of the pixel (x,y) is v(x,y) in the image $I_{n-1}(x,y)$, then in some examples, the candidate region identifier 410 determines that the pixel (x,y) is a fluctuating pixel if following two equations, Equation 1 and Equation 2, are satisfied:

$$D_n(x, y) = I_n(x, y) - I_{n-1}(x, y) \geq T_1 \cdot v(x, y) \quad \text{Equation 1}$$

and $$D_n(x, y) + D_{n+1}(x, y) = I_{n+1}(x, y) - I_{n-1}(x, y) < T_2 \cdot v(x, y) \quad \text{Equation 2}$$

where $T_1 \cdot v(x, y)$ is a first threshold larger than or equal to the second threshold $T_2 \cdot v(x, y)$.

In some examples, the candidate region identifier 410 employs additional or alternative techniques to identify fluctuating pixels. For example, the candidate region identifier 410 may perform a two-dimensional Fourier transform, or other transform, on the sequence of difference images determined by the image comparator 405, and/or on the sequence of input images, to identify spectral peaks indicative of oscillation, or fluctuation, of pixels at locations in the image space.

In the illustrated example of FIG. 4, for a given frame time, n, the candidate region identifier 410 further groups neighboring pixels determined to be fluctuating pixels into groups of fluctuating pixels. Neighboring fluctuating pixels may include fluctuating pixels that are adjacent to each other and/or are within a threshold distance (e.g., number of pixels) from each other. Then, the candidate region identifier 410 determines the number of pixels included in each group of neighboring fluctuating pixels.

The example fluctuating pixel detector 130 of FIG. 4 further includes an example fluctuation evaluator 415 to evaluate the groups of fluctuating pixels identified by the candidate region identifier 410 to determine whether any of the groups corresponds to a region of fluctuating pixels characteristic of the captured video sequence including content generated by a video display of a media device. In the illustrated example, the fluctuation evaluator 415 compares the respective numbers of pixels included in the groups of neighboring fluctuating pixels to a threshold number (e.g., which may be a percentage of the total number of pixels in an image, such as 5%, 10%, etc., or may be some other value). If any of the groups of neighboring fluctuating pixels contains a number of pixels that satisfies (e.g., meets or exceeds) the threshold number, the fluctuation evaluator 415 determines that the sequence of input images (e.g., at that frame time) includes regions of fluctuating pixels. Additionally, in some examples, the fluctuation evaluator 415 identifies the region(s) of fluctuating pixels as corresponding to the location(s) of the group(s) of neighboring fluctuating pixels satisfying the threshold number of pixels.

Figure 11:
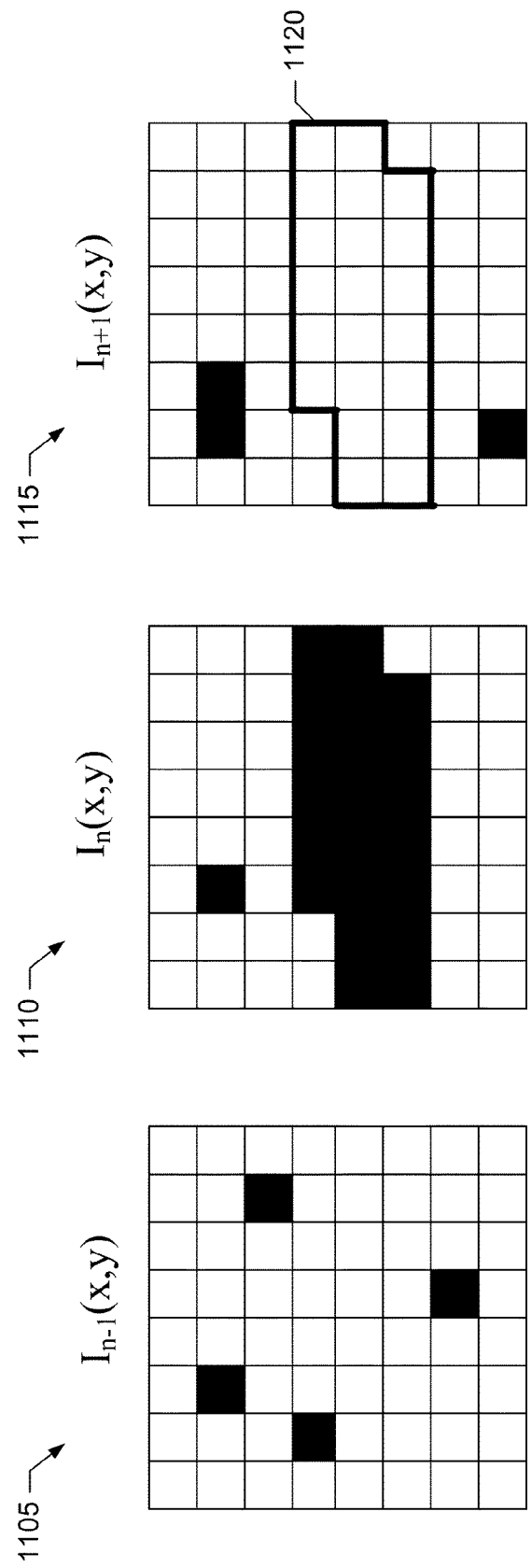
FIG. 11 depicts a sequence of three example image including an example region of fluctuating pixels.

FIG. 11 depicts a sequence of three example images 1105, 1110 and 1115, which include an example region 1120 of fluctuating pixels that could be detected by the example fluctuating pixel detector 130. In the illustrated example of FIG. 11, the example image 1105 corresponds to the image $I_{n-1}(x,y)$, the example image 1110 corresponds to the image $I_n(x,y)$, and the example image 1115 corresponds to the image $I_{n+1}(x,y)$ described above. In the illustrated example of FIG. 11, after processing the example images 1105, 1110 and 1115, the example candidate region identifier 410 of the fluctuating pixel detector 130 determines that the pixels included in the example region 1120 satisfy both conditions (1) and (2) described above. Assuming the example fluctuation evaluator 415 of the fluctuating pixel detector 130 determines that the number of pixels included in the example region 1120 satisfies the threshold number described above, the region 1120 is identified as a fluctuating pixel region.

While an example manner of implementing the example video-based authentication system 100 is illustrated in FIGS. 1-4, one or more of the elements, processes and/or devices illustrated in FIGS. 1-4 may be combined, divided, re-arranged, omitted, eliminated and/or implemented in any other way. Further, the example visual authentication verifier 105, the example access controller 110, the example image capturer 115, the example camera 120, the example actuator 125, the example fluctuating pixel detector 130, the example video sequence validator 135, the example image grabber 305, the example image selector 310, the example image comparator 405, the example candidate region identifier 410, the example fluctuation evaluator 415 and/or, more generally, the example video-based authentication system 100 of FIGS. 1-4 may be implemented by hardware, software, firmware and/or any combination of hardware, software and/or firmware. Thus, for example, any of the example visual authentication verifier 105, the example access controller 110, the example image capturer 115, the example camera 120, the example actuator 125, the example fluctuating pixel detector 130, the example video sequence validator 135, the example image grabber 305, the example image selector 310, the example image comparator 405, the example candidate region identifier 410, the example fluctuation evaluator 415 and/or, more generally, the example video-based authentication system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video-based authentication system 100, the example visual authentication verifier 105, the example access controller 110, the example image capturer 115, the example camera 120, the example actuator 125, the example fluctuating pixel detector 130, the example video sequence validator 135, the example image grabber 305, the example image selector 310, the example image comparator 405, the example candidate region identifier 410 and/or the example fluctuation evaluator 415 is/are hereby expressly defined to include a tangible computer readable storage device or storage disk such as a memory, a digital versatile disk (DVD), a compact disk (CD), a Blu-ray disk, etc. storing the software and/or firmware. Further still, the example video-based authentication system 100 of FIGS. 1-4 may include one or more elements, processes and/or devices in addition to, or instead of, those illustrated in FIGS. 1-4, and/or may include more than one of any or all of the illustrated elements, processes and devices.

Figure 5:
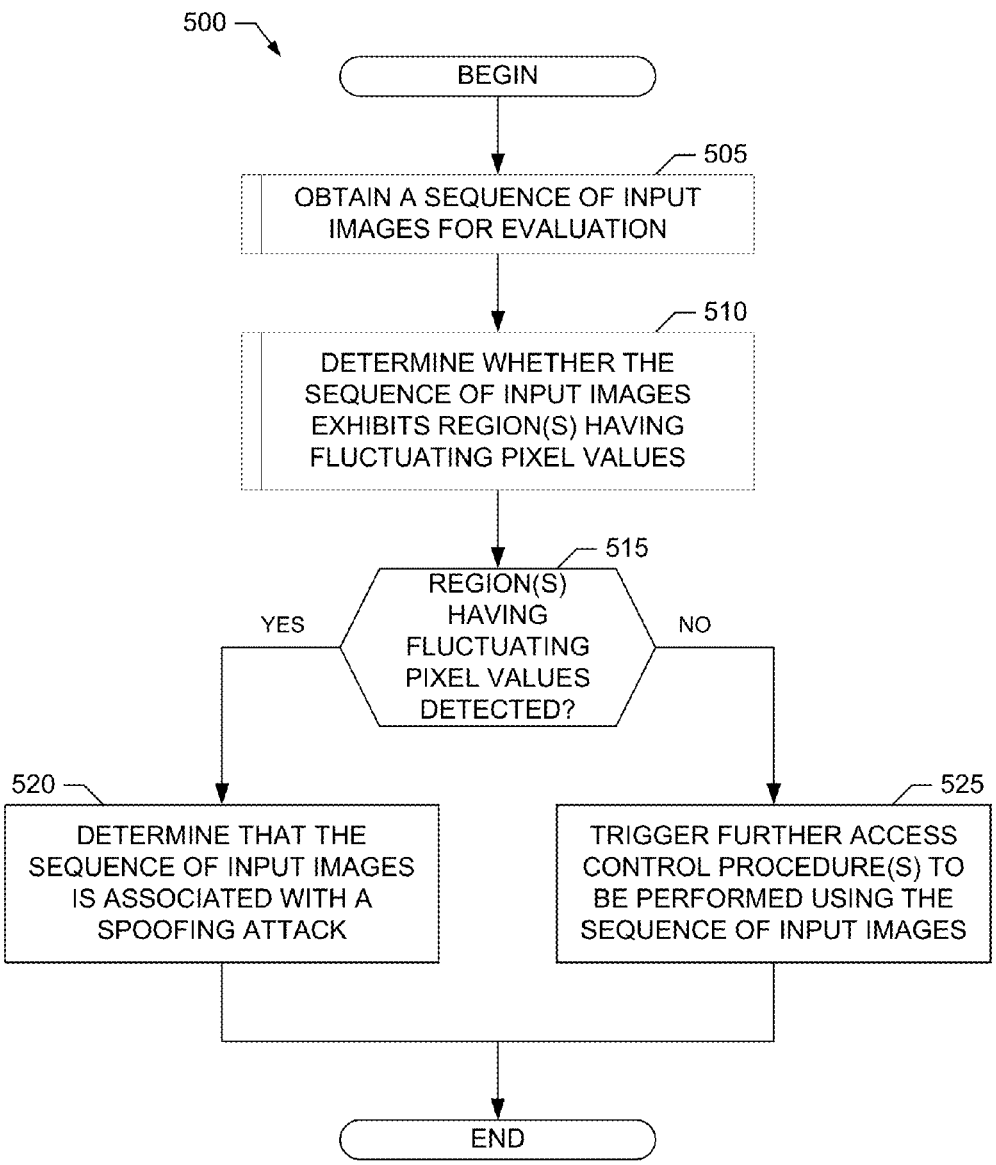
FIG. 5 is a flowchart representative of example machine readable instructions that may be executed to implement the example visual authentication verifier of FIG. 1.
Figure 6:
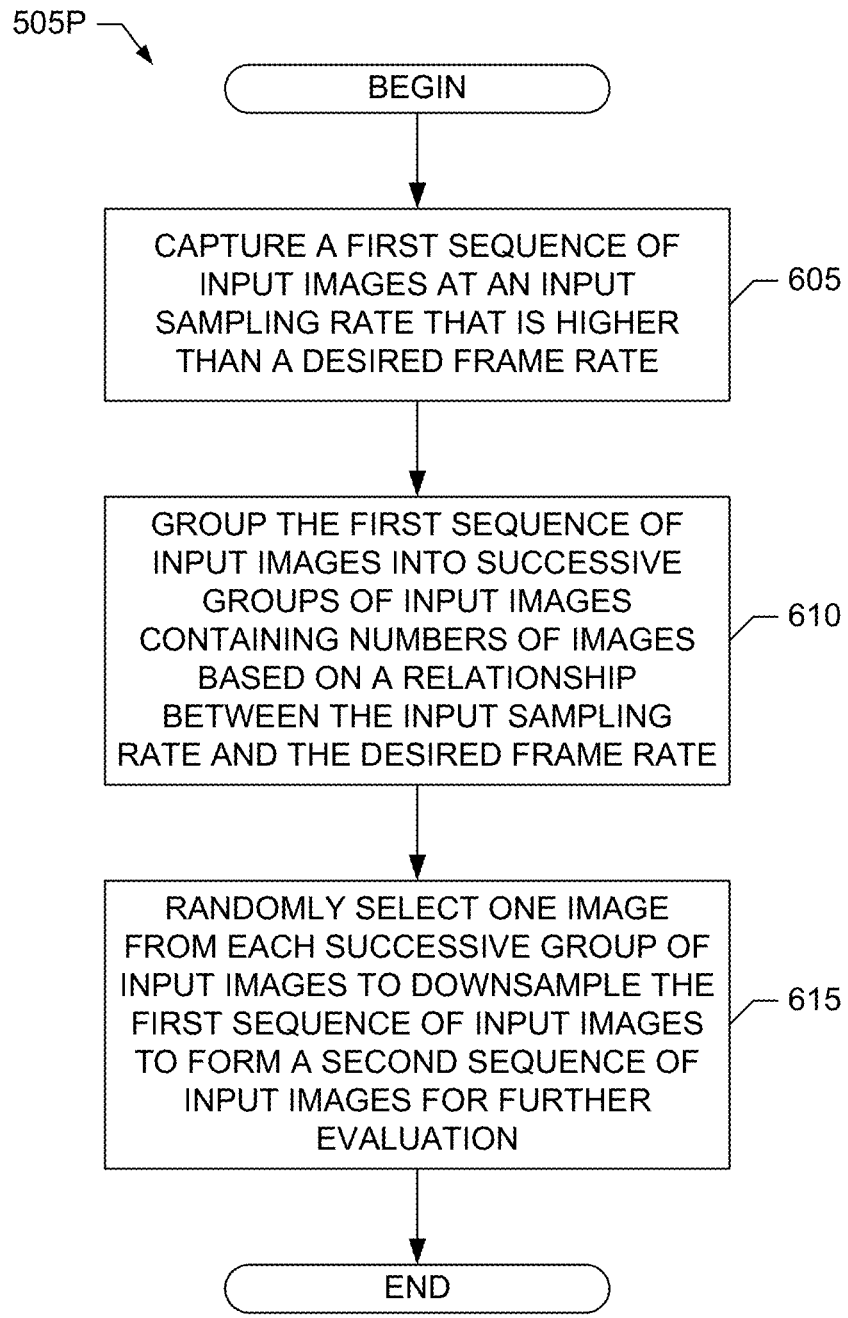
FIG. 6 is a flowchart representative of example machine readable instructions that may be executed to implement the example image capturer of FIG. 3.
Figure 7:
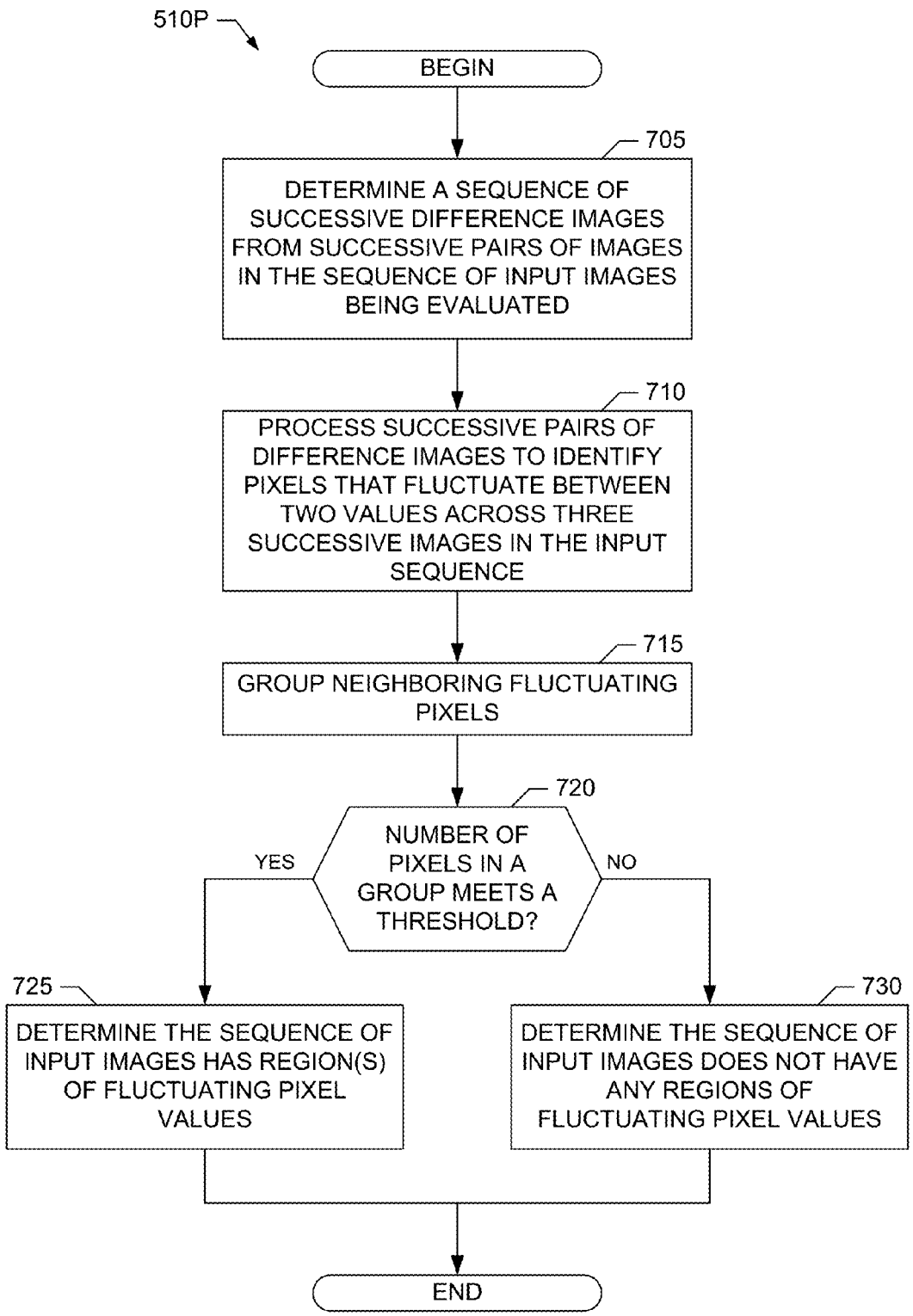
FIG. 7 is a flowchart representative of example machine readable instructions that may be executed to implement the example fluctuating pixel detector of FIG. 4.

Flowcharts representative of example machine readable instructions for implementing the example video-based authentication system 100, the example visual authentication verifier 105, the example access controller 110, the example image capturer 115, the example camera 120, the example actuator 125, the example fluctuating pixel detector 130, the example video sequence validator 135, the example image grabber 305, the example image selector 310, the example image comparator 405, the example candidate region identifier 410 and/or the example fluctuation evaluator 415 are shown in FIGS. 5-7. In these examples, the machine readable instructions comprise one or more programs for execution by a processor, such as the processor(s) 812, 912 and/or 1012 shown in the example processor platforms 800, 900 and 1000 discussed below in connection with FIGS. 8, 9 and 10, respectively. The one or more programs, or portion(s) thereof, may be embodied in software stored on a tangible computer readable storage medium such as a CD-ROM, a floppy disk, a hard drive, a digital versatile disk (DVD), a Blu-ray disk™, or a memory associated with the processor(s) 812, 912 and/or 1012, but the entire program or programs and/or portions thereof could alternatively be executed by a device other than the processors 812, 912 and/or 1012, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5-7, many other methods of implementing the example video-based authentication system 100, the example visual authentication verifier 105, the example access controller 110, the example image capturer 115, the example camera 120, the example actuator 125, the example fluctuating pixel detector 130, the example video sequence validator 135, the example image grabber 305, the example image selector 310, the example image comparator 405, the example candidate region identifier 410 and/or the example fluctuation evaluator 415 may alternatively be used. For example, with reference to the flowcharts illustrated in FIGS. 5-7, the order of execution of the blocks may be changed, and/or some of the blocks described may be changed, eliminated, combined and/or subdivided into multiple blocks.

As mentioned above, the example processes of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-7 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example program 500 including machine readable instructions that may be executed to implement the example visual authentication verifier 105 of the example video-based authentication system 100 of FIG. 1 is illustrated in FIG. 5. The example program 500 may be executed when the example video-based authentication system 100 is activated (e.g., by the example actuator 125) to authenticate a subject in the field of view of the example camera 120. With reference to the preceding figures and associated written descriptions, the example program 500 of FIG. 5 executes block 505 at which the example image capturer 115 of the visual authentication verifier 105 obtains a sequence of input images to be evaluated to determine whether a video sequence output by the camera 120 is valid or is associated with a spoofing attack, as described above. An example program that may be used to implement the processing at block 505 is illustrated in FIG. 6, which is described in further detail below.

At block 510, the example fluctuating pixel detector 130 of the visual authentication verifier 105 determines whether the sequence of input images obtained at block 505 exhibits one or more regions having fluctuating pixel values, as described above. An example program that may be used to implement the processing at block 510 is illustrated in FIG. 7, which is described in further detail below.

At block 515, the example video sequence validator 135 of the visual authentication verifier 105 determines whether one or more regions having fluctuating pixel values were detected at block 510 in the sequence of input images obtained at block 505. If one or more regions having fluctuating pixel values were detected (block 515), then at block 520 the video sequence validator 135 determines, as described above, that the sequence of input images is associated with a spoofing attack. Accordingly, in some examples, at block 520 the video sequence validator 135 prevents the example access controller 110 of the video-based authentication system 100 from performing authentication using the video sequence from the camera 120. However, if no regions having fluctuating pixel values were detected (block 515), then at block 525 the video sequence validator 135 determines that the sequence of input images is valid. Accordingly, as described above, at block 525 the video sequence validator triggers the access controller 110 to perform one or more access control procedures using the sequence of input images obtained at block 505, and/or using the video sequence output from the camera 120.

An example program 505P including machine readable instructions that may be executed to implement the example image capturer 115 of FIG. 3, and/or that may be used to perform the processing at block 505 of FIG. 5, is illustrated in FIG. 6. With reference to the preceding figures and associated written descriptions, the example program 505P of FIG. 6 executes block 605 at which the example image grabber 305 of the image capturer 115 captures a first sequence of input images from a video output of the example camera 120 at a first (sampling) rate that is higher than a second (desired) frame rate, as described above. At block 610, the example image selector 310 of the image capturer 115 groups the images of the first sequence into successive groups of input images containing respective numbers of images determined by the relationship (e.g., a ratio) between the first (e.g., sampling) rate and the second (e.g., desired) rate, as described above. At block 615, the image selector 310 randomly selects one input image from each one of the successive groups of input images to form a second sequence of input images for further evaluation, as described above.

An example program 510P including machine readable instructions that may be executed to implement the example fluctuating pixel detector 130 of FIG. 4, and/or that may be used to perform the processing at block 510 of FIG. 5, is illustrated in FIG. 7. With reference to the preceding figures and associated written descriptions, the example program 510P of FIG. 7 executes block 705 at which the example image comparator 405 of the fluctuating pixel detector 130 determines a sequence of difference images from successive pairs of images in a sequence of input images being evaluated (e.g., such as a sequence of input images obtained by the example image capturer 115), as described above. At block 710, the example candidate region identifier 410 of the fluctuating pixel detector 130 processes, as described above, successive pairs of difference images in the sequence of difference images to identify fluctuating pixels, which are pixels that fluctuate between at least two values across three successive images (which may or may not be adjacent) in the sequence of input images being evaluated. At block 715, the candidate region identifier 410 groups neighboring fluctuating pixels into groups of fluctuating pixels, as described above.

At block 720, the example fluctuation evaluator 415 of the fluctuating pixel detector 130 determines whether any of the groups of neighboring fluctuating pixels determines at block 715 contains a number of pixels that satisfies (e.g., meets or exceeds) a threshold number, as described above. If any group of neighboring fluctuating pixels satisfies the threshold number of pixels (block 720), then at block 725 the fluctuation evaluator 415 determines that the sequence of input images includes regions of fluctuating pixels, as described above. Otherwise, if no group of neighboring fluctuating pixels satisfies the threshold number of pixels (block 720), then at block 730 the fluctuation evaluator 415 determines that the sequence of input images does not have any regions of fluctuating pixels.

Figure 8:
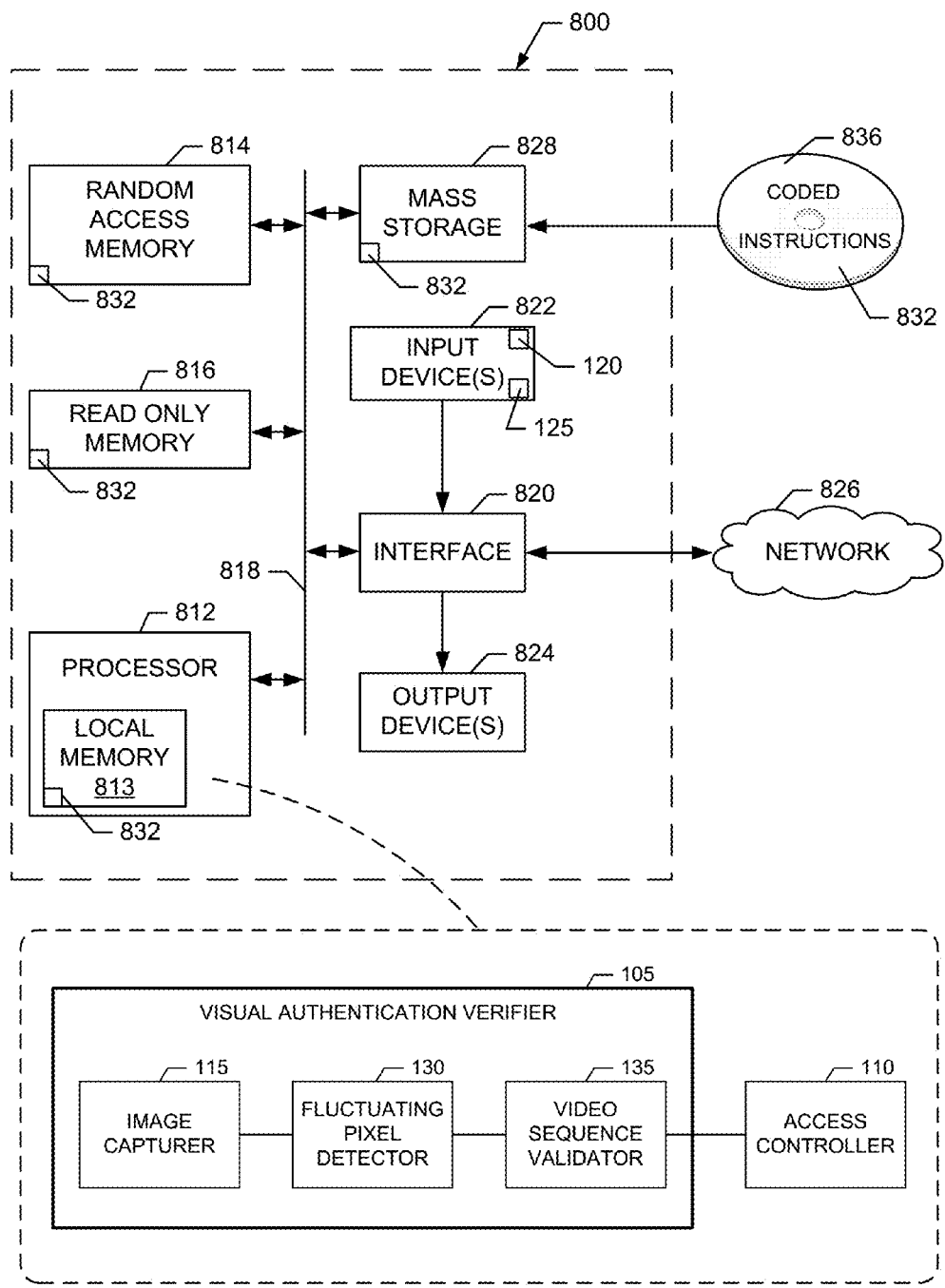
FIG. 8 is a block diagram of an example processor platform structured to execute the example machine readable instructions of FIG. 5 to implement the example visual authentication verifier of FIG. 1.

FIG. 8 is a block diagram of an example processor platform 800 capable of executing the instructions of FIG. 5 to implement the example video-based authentication system 100, the example visual authentication verifier 105, the example access controller 110, the example image capturer 115, the example camera 120, the example actuator 125, the example fluctuating pixel detector 130 and/or the example video sequence validator 135 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a digital camera, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 is configured to implement the example visual authentication verifier 105, the example access controller 110, the example image capturer 115, the example fluctuating pixel detector 130 and the example video sequence validator 135 of FIG. 1.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video) such as the example camera 120, a keyboard, a button, a mouse, a touchscreen, a track-pad, a trackball, a trackbar (such as an isopoint), a voice recognition system, the example actuator 125 and/or any other human-machine interface. Also, many systems, such as the processor platform 800, can allow the user to control the computer system and provide data to the computer using physical gestures, such as, but not limited to, hand or body movements, facial expressions, and face recognition One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, and digital versatile disk (DVD) drives.

Coded instructions 832 corresponding to the instructions of FIG. 5 may be stored in the mass storage device 828, in the volatile memory 814, in the non-volatile memory 816, in the local memory 813 and/or on a removable tangible computer readable storage medium, such as a CD or DVD 836.

Figure 9:
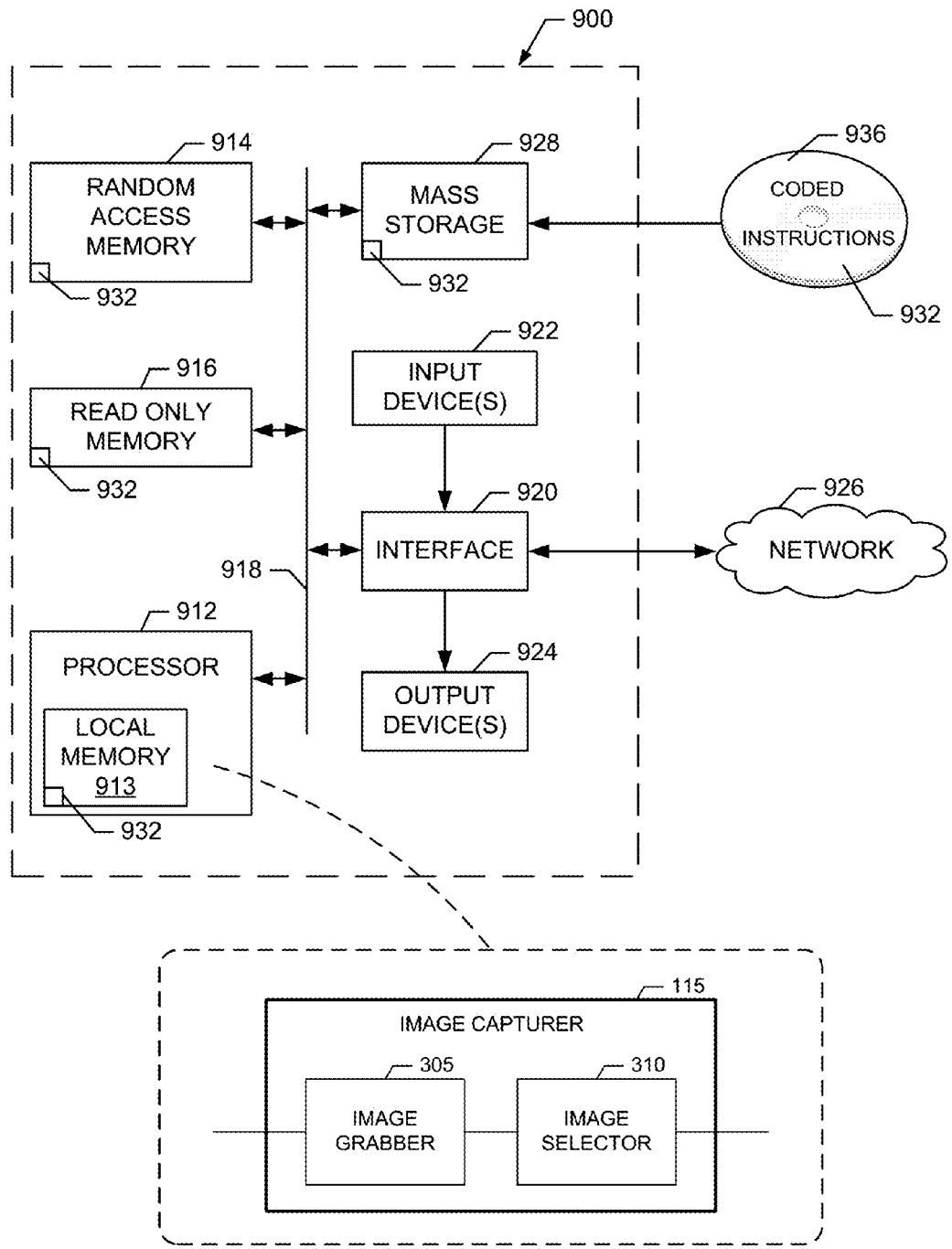
FIG. 9 is a block diagram of an example processor platform structured to execute the example machine readable instructions of FIG. 6 to implement the example image capturer of FIG. 3.

FIG. 9 is a block diagram of an example processor platform 900 capable of executing the instructions of FIG. 6 to implement the example image capturer 115, the example image grabber 305 and/or the example image selector 310 of FIG. 3. The processor platform 900 can be, for example, a server, a personal computer, a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a digital camera, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example of FIG. 9, the processor 912 is configured to implement the example image capturer 115, the example image grabber 305 and the example image selector 310 of FIG. 3.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by SDRAM, DRAM, RDRAM and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a USB, and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system, and/or any other human-machine interface. Also, many systems, such as the processor platform 900, can allow the user to control the computer system and provide data to the computer using physical gestures, such as, but not limited to, hand or body movements, facial expressions, and face recognition One or more output devices 924 are also connected to the interface circuit 920 of the illustrated example. The output devices 924 can be implemented, for example, by display devices (e.g., an LED, an OLED, a liquid crystal display, a CRT display, a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a DSL, a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and DVD drives.

Coded instructions 932 corresponding to the instructions of FIG. 6 may be stored in the mass storage device 928, in the volatile memory 914, in the non-volatile memory 916, in the local memory 913 and/or on a removable tangible computer readable storage medium, such as a CD or DVD 936.

Figure 10:
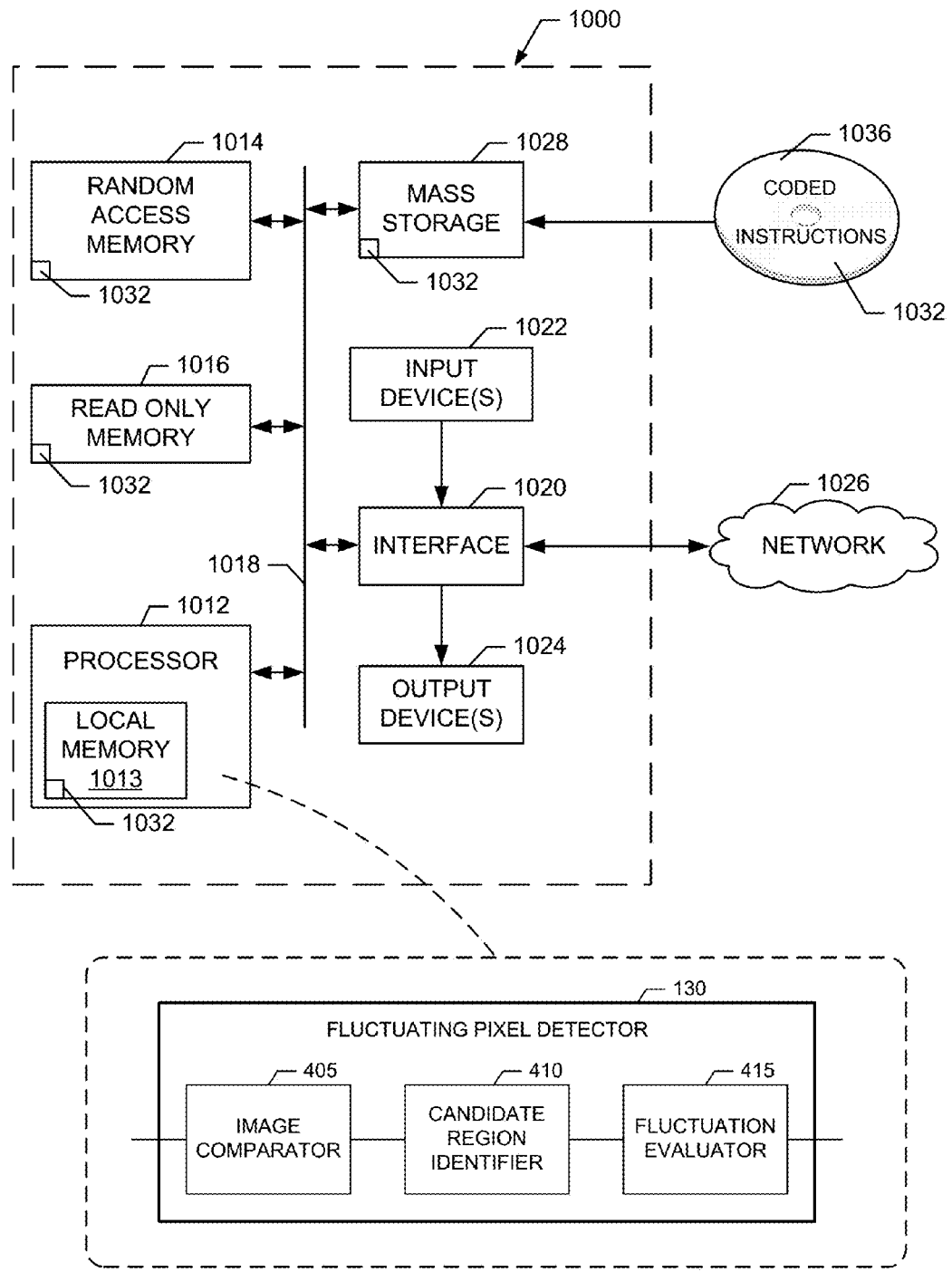
FIG. 10 is a block diagram of an example processor platform structured to execute the example machine readable instructions of FIG. 7 to implement the example fluctuating pixel detector of FIG. 4.

FIG. 10 is a block diagram of an example processor platform 1000 capable of executing the instructions of FIG. 7 to implement the example fluctuating pixel detector 130, the example image comparator 405, the example candidate region identifier 410 and/or the example fluctuation evaluator 415 of FIG. 4. The processor platform 1000 can be, for example, a server, a personal computer, a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a digital camera, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, the processor 1012 is configured to implement the example fluctuating pixel detector 130, the example image comparator 405, the example candidate region identifier 410 and the example fluctuation evaluator 415 of FIG. 4.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by SDRAM, DRAM, RDRAM and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system, and/or any other human-machine interface. Also, many systems, such as the processor platform 1000, can allow the user to control the computer system and provide data to the computer using physical gestures, such as, but not limited to, hand or body movements, facial expressions, and face recognition One or more output devices 1024 are also connected to the interface circuit 1020 of the illustrated example. The output devices 1024 can be implemented, for example, by display devices (e.g., an LED, an OLED, a liquid crystal display, a CRT display, a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a DSL, a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID (redundant array of independent disks) systems, and DVD drives.

Coded instructions 1032 corresponding to the instructions of FIG. 7 may be stored in the mass storage device 1028, in the volatile memory 1014, in the non-volatile memory 1016, in the local memory 1013 and/or on a removable tangible computer readable storage medium, such as a CD or DVD 1036.

The following further examples, which include subject matter such as a method to perform video-based authentication, means for performing video-based authentication, at least one machine-readable medium including instructions that, when performed by a machine cause the machine to perform video-based authentication, an apparatus and/or a system to video-based authentication, are disclosed herein.

Example 1 is a method to perform video-based authentication, which includes determining, with a processor, whether a sequence of input images provided to perform video-based authentication of a subject exhibits a first region having fluctuating pixel value. The method of example 1 also includes determining, with the processor, that the sequence of input images is associated with a spoofing attack in response to determining that the sequence of input images exhibits the first region having fluctuating pixel values.

Example 2 includes the subject matter of example 1, wherein the sequence of input images is a second sequence of input images, and further including randomly sampling a first sequence of input images to obtain the second sequence of input images.

Example 3 includes the subject matter of example 2, wherein randomly sampling the first sequence of input images includes capturing the first sequence of input images at a first rate higher than a second rate, grouping the first sequence of input images into successive groups of input images containing respective numbers of images based on a relationship between the first rate and the second rate, randomly selecting one input image from respective ones of the successive groups of input images to form the second sequence of input images.

Example 4 includes the subject matter of example 1, wherein determining whether the sequence of input images exhibits the first region having fluctuating pixels values includes determining differences between successive pairs of images in the sequence of input images to determine a sequence of difference images, and processing the sequence of difference images to determine whether the sequence of input images exhibits the first region having fluctuating pixel values.

Example 5 includes the subject matter of example 4, wherein processing the sequence of difference images includes processing successive pairs of difference images in the sequence of difference images to identify fluctuating pixels, the fluctuating pixels being pixels that fluctuate between at least two values across three successive images in the sequence of input images, determining a number of pixels included in a first group of neighboring fluctuating pixels, and if the number of pixels satisfies a threshold, determining that the sequence of input images exhibits the first region having fluctuating pixel values, the first region corresponding to the first group of neighboring fluctuating pixels.

Example 6 includes the subject matter of example 1, and further includes triggering operation of a further access control procedure to authenticate the subject based on the sequence of input images in response to determining that the sequence of input images does not exhibit any region having fluctuating pixel values.

Example 7 includes the subject matter of example 1, and further includes determining that the sequence of input images depicts a scene including content generated by a video display in response to determining that the sequence of input images exhibits the first region having fluctuating pixel values.

Example 8 includes the subject matter of any one of examples 1 to 3, wherein determining whether the sequence of input images exhibits the first region having fluctuating pixels values includes determining differences between successive pairs of images in the sequence of input images to determine a sequence of difference images, and processing the sequence of difference images to determine whether the sequence of input images exhibits the first region having fluctuating pixel values.

Example 9 includes the subject matter of example 8, wherein processing the sequence of difference images includes processing successive pairs of difference images in the sequence of difference images to identify fluctuating pixels, the fluctuating pixels being pixels that fluctuate between at least two values across three successive images in the sequence of input images, determining a number of pixels included in a first group of neighboring fluctuating pixels, and if the number of pixels satisfies a threshold, determining that the sequence of input images exhibits the first region having fluctuating pixel values, the first region corresponding to the first group of neighboring fluctuating pixels.

Example 10 includes the subject matter of any one of examples 1 to 3, and further includes triggering operation of a further access control procedure to authenticate the subject based on the sequence of input images in response to determining that the sequence of input images does not exhibit any region having fluctuating pixel values.

Example 11 includes the subject matter of any one of examples 1 to 3, and further includes determining that the sequence of input images depicts a scene including content generated by a video display in response to determining that the sequence of input images exhibits the first region having fluctuating pixel values.

Example 12 is a tangible machine readable storage medium including machine readable instructions which, when executed, cause a machine to at least determine whether a sequence of input images provided to perform video-based authentication of a subject exhibits a first region having fluctuating pixel values, and determine that the sequence of input images is associated with a spoofing attack in response to determining that the sequence of input images exhibits the first region having fluctuating pixel values.

Example 13 includes the subject matter of example 12, wherein the sequence of input images is a second sequence of input images, and the machine readable instructions, when executed, further cause the machine to randomly sample a first sequence of input images to obtain the second sequence of input images.

Example 14 includes the subject matter of example 13, wherein to randomly sample the first sequence of input images, the machine readable instructions, when executed, further cause the machine to capture the first sequence of input images at a first rate higher than a second rate, group the first sequence of input images into successive groups of input images containing respective numbers of images based on a relationship between the first rate and the second rate, and randomly select one input image from respective ones of the successive groups of input images to form the second sequence of input images.

Example 15 includes the subject matter of example 12, wherein to determine whether the sequence of input images exhibits the first region having fluctuating pixels values, the machine readable instructions, when executed, further cause the machine to determine differences between successive pairs of images in the sequence of input images to determine a sequence of difference images, and process the sequence of difference images to determine whether the sequence of input images exhibits the first region having fluctuating pixel values.

Example 16 includes the subject matter of example 15, wherein to process the sequence of difference images, the machine readable instructions, when executed, further cause the machine to process successive pairs of difference images in the sequence of difference images to identify fluctuating pixels, the fluctuating pixels being pixels that fluctuate between at least two values across three successive images in the sequence of input images, determine a number of pixels included in a first group of neighboring fluctuating pixels, and if the number of pixels satisfies a threshold, determine that the sequence of input images exhibits the first region having fluctuating pixel values, the first region corresponding to the first group of neighboring fluctuating pixels.

Example 17 includes the subject matter of example 12, wherein the machine readable instructions, when executed, further cause the machine to trigger operation of a further access control procedure to authenticate the subject based on the sequence of input images in response to determining that the sequence of input images does not exhibit any region having fluctuating pixel values.

Example 18 includes the subject matter of example 12, wherein the machine readable instructions, when executed, further cause the machine to determine that the sequence of input images depicts a scene including content generated by a video display in response to determining that the sequence of input images exhibits the first region having fluctuating pixel values.

Example 19 includes the subject matter of any one of examples 12 to 14, wherein to determine whether the sequence of input images exhibits the first region having fluctuating pixels values, the machine readable instructions, when executed, further cause the machine to determine differences between successive pairs of images in the sequence of input images to determine a sequence of difference images, and process the sequence of difference images to determine whether the sequence of input images exhibits the first region having fluctuating pixel values.

Example 20 includes the subject matter of example 19, wherein to process the sequence of difference images, the machine readable instructions, when executed, further cause the machine to process successive pairs of difference images in the sequence of difference images to identify fluctuating pixels, the fluctuating pixels being pixels that fluctuate between at least two values across three successive images in the sequence of input images, determine a number of pixels included in a first group of neighboring fluctuating pixels, and if the number of pixels satisfies a threshold, determine that the sequence of input images exhibits the first region having fluctuating pixel values, the first region corresponding to the first group of neighboring fluctuating pixels.

Example 21 includes the subject matter of any one of examples 12 to 14, wherein the machine readable instructions, when executed, further cause the machine to trigger operation of a further access control procedure to authenticate the subject based on the sequence of input images in response to determining that the sequence of input images does not exhibit any region having fluctuating pixel values.

Example 22 includes the subject matter of any one of examples 12 to 14, wherein the machine readable instructions, when executed, further cause the machine to determine that the sequence of input images depicts a scene including content generated by a video display in response to determining that the sequence of input images exhibits the first region having fluctuating pixel values.

Example 23 is a tangible machine readable storage medium including machine readable instructions which, when executed, cause a machine to perform a method as defined in any one of examples 1 to 11.

Example 24 is an apparatus to perform video-based authentication, which includes a fluctuating pixel detector to determine whether a sequence of input images provided to perform video-based authentication of a subject exhibits a first region having fluctuating pixel values. The apparatus of example 24 also includes a video sequence validator to determine that the sequence of input images is associated with a spoofing attack in response to determining that the sequence of input images exhibits the first region having fluctuating pixel values.

Example 25 includes the subject matter of example 24, wherein the sequence of input images is a second sequence of input images, and further including an image capturer to randomly sample a first sequence of input images to obtain the second sequence of input images.

Example 26 includes the subject matter of example 25, wherein the image capturer is to randomly sample the first sequence of input images by capturing the first sequence of input images at a first rate higher than a second rate, grouping the first sequence of input images into successive groups of input images containing respective numbers of images based on a relationship between the first rate and the second rate, and randomly selecting one input image from respective ones of the successive groups of input images to form the second sequence of input images.

Example 27 includes the subject matter of example 24, wherein the fluctuating pixel detector is further to determine differences between successive pairs of images in the sequence of input images to determine a sequence of difference images, and process the sequence of difference images to determine whether the sequence of input images exhibits the first region having fluctuating pixel values.

Example 28 includes the subject matter of example 27, wherein the fluctuating pixel detector is to process the sequence of difference images by processing successive pairs of difference images in the sequence of difference images to identify fluctuating pixels, the fluctuating pixels being pixels that fluctuate between at least two values across three successive images in the sequence of input images, determining a number of pixels included in a first group of neighboring fluctuating pixels, and if the number of pixels satisfies a threshold, determining that the sequence of input images exhibits the first region having fluctuating pixel values, the first region corresponding to the first group of neighboring fluctuating pixels.

Example 29 includes the subject matter of example 24, wherein the video sequence validator is further to trigger operation of a further access control procedure to authenticate the subject based on the sequence of input images in response to determining that the sequence of input images does not exhibit any region having fluctuating pixel values.

Example 30 includes the subject matter of example 24, wherein the video sequence validator is further to determine that the sequence of input images depicts a scene including content generated by a video display in response to determining that the sequence of input images exhibits the first region having fluctuating pixel values.

Example 31 includes the subject matter of any one of examples 24 to 26, wherein the fluctuating pixel detector is further to determine differences between successive pairs of images in the sequence of input images to determine a sequence of difference images, and process the sequence of difference images to determine whether the sequence of input images exhibits the first region having fluctuating pixel values.

Example 32 includes the subject matter of example 31, wherein the fluctuating pixel detector is to process the sequence of difference images by processing successive pairs of difference images in the sequence of difference images to identify fluctuating pixels, the fluctuating pixels being pixels that fluctuate between at least two values across three successive images in the sequence of input images, determining a number of pixels included in a first group of neighboring fluctuating pixels, and if the number of pixels satisfies a threshold, determining that the sequence of input images exhibits the first region having fluctuating pixel values, the first region corresponding to the first group of neighboring fluctuating pixels.

Example 33 includes the subject matter of any one of examples 24 to 26, wherein the video sequence validator is further to trigger operation of a further access control procedure to authenticate the subject based on the sequence of input images in response to determining that the sequence of input images does not exhibit any region having fluctuating pixel values.

Example 34 includes the subject matter of any one of examples 24 to 26, wherein the video sequence validator is further to determine that the sequence of input images depicts a scene including content generated by a video display in response to determining that the sequence of input images exhibits the first region having fluctuating pixel values.

Example 35 is an apparatus including a processor configured to perform a method as defined in any one of examples 1 to 11.

Example 36 is a system to perform video-based authentication, which includes means for determining whether a sequence of input images provided to perform video-based authentication of a subject exhibits a first region having fluctuating pixel values. The system of example 36 also includes means for determining that the sequence of input images is associated with a spoofing attack in response to determining that the sequence of input images exhibits the first region having fluctuating pixel values.

Example 37 includes the subject matter of example 36, wherein the sequence of input images is a second sequence of input images, and further including means for randomly sampling a first sequence of input images to obtain the second sequence of input images.

Example 38 includes the subject matter of example 37, wherein the means for randomly sampling the first sequence of input images includes means for capturing the first sequence of input images at a first rate higher than a second rate, means for grouping the first sequence of input images into successive groups of input images containing respective numbers of images based on a relationship between the first rate and the second rate, and means for randomly selecting one input image from respective ones of the successive groups of input images to form the second sequence of input images.

Example 39 includes the subject matter of example 36, wherein the means for determining whether the sequence of input images exhibits the first region having fluctuating pixels values includes means for determining differences between successive pairs of images in the sequence of input images to determine a sequence of difference images, and means for processing the sequence of difference images to determine whether the sequence of input images exhibits the first region having fluctuating pixel values.

Example 40 includes the subject matter of example 39, wherein the means for processing the sequence of difference images includes means for processing successive pairs of difference images in the sequence of difference images to identify fluctuating pixels, the fluctuating pixels being pixels that fluctuate between at least two values across three successive images in the sequence of input images, means for determining a number of pixels included in a first group of neighboring fluctuating pixels, and means for determining that the sequence of input images exhibits the first region having fluctuating pixel values if the number of pixels satisfies a threshold, the first region corresponding to the first group of neighboring fluctuating pixels.

Example 41 includes the subject matter of example 36, and further includes means for triggering operation of a further access control procedure to authenticate the subject based on the sequence of input images in response to determining that the sequence of input images does not exhibit any region having fluctuating pixel values.

Example 42 includes the subject matter of example 36, and further includes means for determining that the sequence of input images depicts a scene including content generated by a video display in response to determining that the sequence of input images exhibits the first region having fluctuating pixel values.

Example 43 includes the subject matter of any one of examples 36 to 39, wherein the means for determining whether the sequence of input images exhibits the first region having fluctuating pixels values includes means for determining differences between successive pairs of images in the sequence of input images to determine a sequence of difference images, and means for processing the sequence of difference images to determine whether the sequence of input images exhibits the first region having fluctuating pixel values.

Example 44 includes the subject matter of example 43, wherein the means for processing the sequence of difference images includes means for processing successive pairs of difference images in the sequence of difference images to identify fluctuating pixels, the fluctuating pixels being pixels that fluctuate between at least two values across three successive images in the sequence of input images, means for determining a number of pixels included in a first group of neighboring fluctuating pixels, and means for determining that the sequence of input images exhibits the first region having fluctuating pixel values if the number of pixels satisfies a threshold, the first region corresponding to the first group of neighboring fluctuating pixels.

Example 45 includes the subject matter of any one of examples 36 to 39, and further includes means for triggering operation of a further access control procedure to authenticate the subject based on the sequence of input images in response to determining that the sequence of input images does not exhibit any region having fluctuating pixel values.

Example 46 includes the subject matter of any one of examples 36 to 39, and further includes means for determining that the sequence of input images depicts a scene including content generated by a video display in response to determining that the sequence of input images exhibits the first region having fluctuating pixel values.

Example 47 is a system including means for performing a method as defined in any one of examples 1 to 11.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to perform video-based authentication, the method comprising:
   determining, by executing an instruction with a processor, whether a sequence of input images provided to perform video-based authentication of a subject exhibits a first region having pixel values that fluctuate across successive ones of at least some of the images in the sequence; and
   determining, by executing an instruction with the processor, that the sequence of input images is associated with a spoofing attack in response to determining that the sequence of input images exhibits the first region having pixel values that fluctuate.

2. The method as defined in claim 1, wherein the sequence of input images is a second sequence of input images, and further including randomly sampling a first sequence of input images to obtain the second sequence of input images.

3. The method as defined in claim 2, wherein randomly sampling the first sequence of input images includes:
   capturing the first sequence of input images at a first rate higher than a second rate;
   grouping the first sequence of input images into successive groups of input images containing respective numbers of images based on a relationship between the first rate and the second rate; and
   randomly selecting one input image from respective ones of the successive groups of input images to form the second sequence of input images.

4. The method as defined in claim 1, wherein the determining of whether the sequence of input images exhibits the first region having pixels values that fluctuate includes:
   determining differences between successive pairs of images in the sequence of input images to determine a sequence of difference images; and
   processing the sequence of difference images to determine whether the sequence of input images exhibits the first region having pixel values that fluctuate.

5. The method as defined in claim 4, wherein the processing of the sequence of difference images includes:
   processing successive pairs of difference images in the sequence of difference images to identify fluctuating pixels, the fluctuating pixels being pixels that fluctuate between at least two values across three successive images in the sequence of input images;
   determining a number of pixels included in a first group of neighboring fluctuating pixels; and
   if the number of pixels satisfies a threshold, determining that the sequence of input images exhibits the first region having pixel values that fluctuate, the first region corresponding to the first group of neighboring fluctuating pixels.

6. The method as defined in claim 1, further including triggering operation of a further access control procedure to authenticate the subject based on the sequence of input images in response to determining that the sequence of input images does not exhibit any region having fluctuating pixel values.

7. The method as defined in claim 1, further including determining that the sequence of input images depicts a scene including content generated by a video display in response to determining that the sequence of input images exhibits the first region having pixel values that fluctuate.

8. A tangible machine readable storage medium comprising machine readable instructions which, when executed, cause a machine to at least:
   determine whether a sequence of input images provided to perform video-based authentication of a subject exhibits a first region having pixel values that fluctuate across successive ones of at least some of the images in the sequence; and
   determine that the sequence of input images is associated with a spoofing attack in response to determining that the sequence of input images exhibits the first region having pixel values that fluctuate.

9. The storage medium as defined in claim 8, wherein the sequence of input images is a second sequence of input images, and the machine readable instructions, when executed, further cause the machine to randomly sample a first sequence of input images to obtain the second sequence of input images.

10. The storage medium as defined in claim 9, wherein to randomly sample the first sequence of input images, the machine readable instructions, when executed, further cause the machine to:
    capture the first sequence of input images at a first rate higher than a second rate;
    group the first sequence of input images into successive groups of input images containing respective numbers of images based on a relationship between the first rate and the second rate; and
    randomly select one input image from respective ones of the successive groups of input images to form the second sequence of input images.

11. The storage medium as defined in claim 8, wherein to determine whether the sequence of input images exhibits the first region having pixels values that fluctuate, the machine readable instructions, when executed, further cause the machine to:
    determine differences between successive pairs of images in the sequence of input images to determine a sequence of difference images; and process the sequence of difference images to determine whether the sequence of input images exhibits the first region having pixel values that fluctuate.

12. The storage medium as defined in claim 11, wherein to process the sequence of difference images, the machine readable instructions, when executed, further cause the machine to:
process successive pairs of difference images in the sequence of difference images to identify fluctuating pixels, the fluctuating pixels being pixels that fluctuate between at least two values across three successive images in the sequence of input images;
determine a number of pixels included in a first group of neighboring fluctuating pixels; and
if the number of pixels satisfies a threshold, determine that the sequence of input images exhibits the first region having pixel values that fluctuate, the first region corresponding to the first group of neighboring fluctuating pixels.

13. The storage medium as defined in claim 8, wherein the machine readable instructions, when executed, further cause the machine to trigger operation of a further access control procedure to authenticate the subject based on the sequence of input images in response to determining that the sequence of input images does not exhibit any region having fluctuating pixel values.

14. The storage medium as defined in claim 8, wherein the machine readable instructions, when executed, further cause the machine to determine that the sequence of input images depicts a scene including content generated by a video display in response to determining that the sequence of input images exhibits the first region having fluctuating pixel values.

15. An apparatus to perform video-based authentication, the apparatus comprising:
a fluctuating pixel detector to determine whether a sequence of input images provided to perform video-based authentication of a subject exhibits a first region having pixel values that fluctuate across successive ones of at least some of the images in the sequence; and
a video sequence validator to determine that the sequence of input images is associated with a spoofing attack in response to determining that the sequence of input images exhibits the first region having pixel values that fluctuate.

16. The apparatus as defined in claim 15, wherein the sequence of input images is a second sequence of input images, and further including an image capturer to randomly sample a first sequence of input images to obtain the second sequence of input images.

17. The apparatus as defined in claim 16, wherein the image capturer is to randomly sample the first sequence of input images by:
capturing the first sequence of input images at a first rate higher than a second rate;
grouping the first sequence of input images into successive groups of input images containing respective numbers of images based on a relationship between the first rate and the second rate; and
randomly selecting one input image from respective ones of the successive groups of input images to form the second sequence of input images.

18. The apparatus as defined in claim 15, wherein the fluctuating pixel detector is further to:
determine differences between successive pairs of images in the sequence of input images to determine a sequence of difference images; and
process the sequence of difference images to determine whether the sequence of input images exhibits the first region having pixel values that fluctuate.

19. The apparatus as defined in claim 18, wherein the fluctuating pixel detector is to process the sequence of difference images by:
processing successive pairs of difference images in the sequence of difference images to identify fluctuating pixels, the fluctuating pixels being pixels that fluctuate between at least two values across three successive images in the sequence of input images;
determining a number of pixels included in a first group of neighboring fluctuating pixels; and
if the number of pixels satisfies a threshold, determining that the sequence of input images exhibits the first region having pixel values that fluctuate, the first region corresponding to the first group of neighboring fluctuating pixels.

20. The apparatus as defined in claim 15, wherein the video sequence validator is further to trigger operation of a further access control procedure to authenticate the subject based on the sequence of input images in response to determining that the sequence of input images does not exhibit any region having fluctuating pixel values.

21. The apparatus as defined in claim 15, wherein the video sequence validator is further to determine that the sequence of input images depicts a scene including content generated by a video display in response to determining that the sequence of input images exhibits the first region having pixel values that fluctuate.

22. A system to perform video-based authentication, the system comprising:
means for determining whether a sequence of input images provided to perform video-based authentication of a subject exhibits a first region having pixel values that fluctuate across successive ones of at least some of the images in the sequence; and
means for determining that the sequence of input images is associated with a spoofing attack in response to determining that the sequence of input images exhibits the first region having pixel values that fluctuate.

23. The system as defined in claim 22, wherein the sequence of input images is a second sequence of input images, and further including means for randomly sampling a first sequence of input images to obtain the second sequence of input images.

24. The system as defined in claim 22, wherein the means for determining whether the sequence of input images exhibits the first region having pixels values that fluctuate includes:
means for determining differences between successive pairs of images in the sequence of input images to determine a sequence of difference images; and
means for processing the sequence of difference images to determine whether the sequence of input images exhibits the first region having pixel values that fluctuate.

25. The system as defined in claim 22, further including means for triggering operation of a further access control procedure to authenticate the subject based on the sequence of input images in response to determining that the sequence of input images does not exhibit any region having fluctuating pixel values.

* * * * *